May 20, 1958     S. C. KILLIAN ET AL     2,835,723
TELESCOPIC INSPECTION SECTIONS FOR BUS ENCLOSURES
Filed Dec. 6, 1954     2 Sheets-Sheet 1
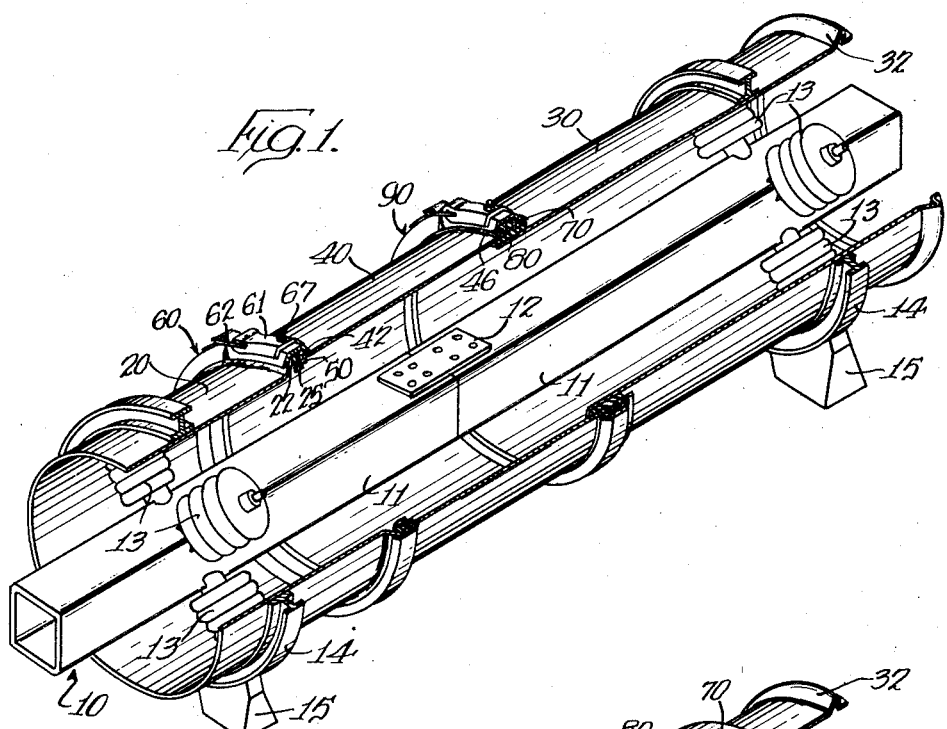
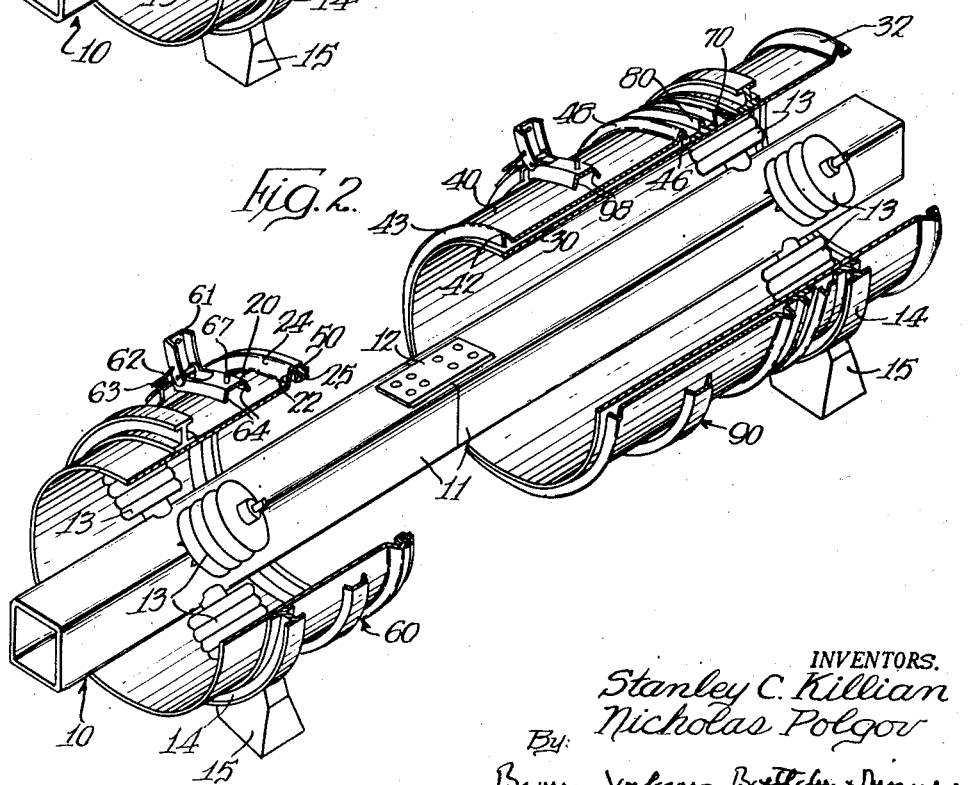
INVENTORS.
Stanley C. Killian
Nicholas Polgov
By: Brown, Jackson, Boettcher, Dienner
Attys.

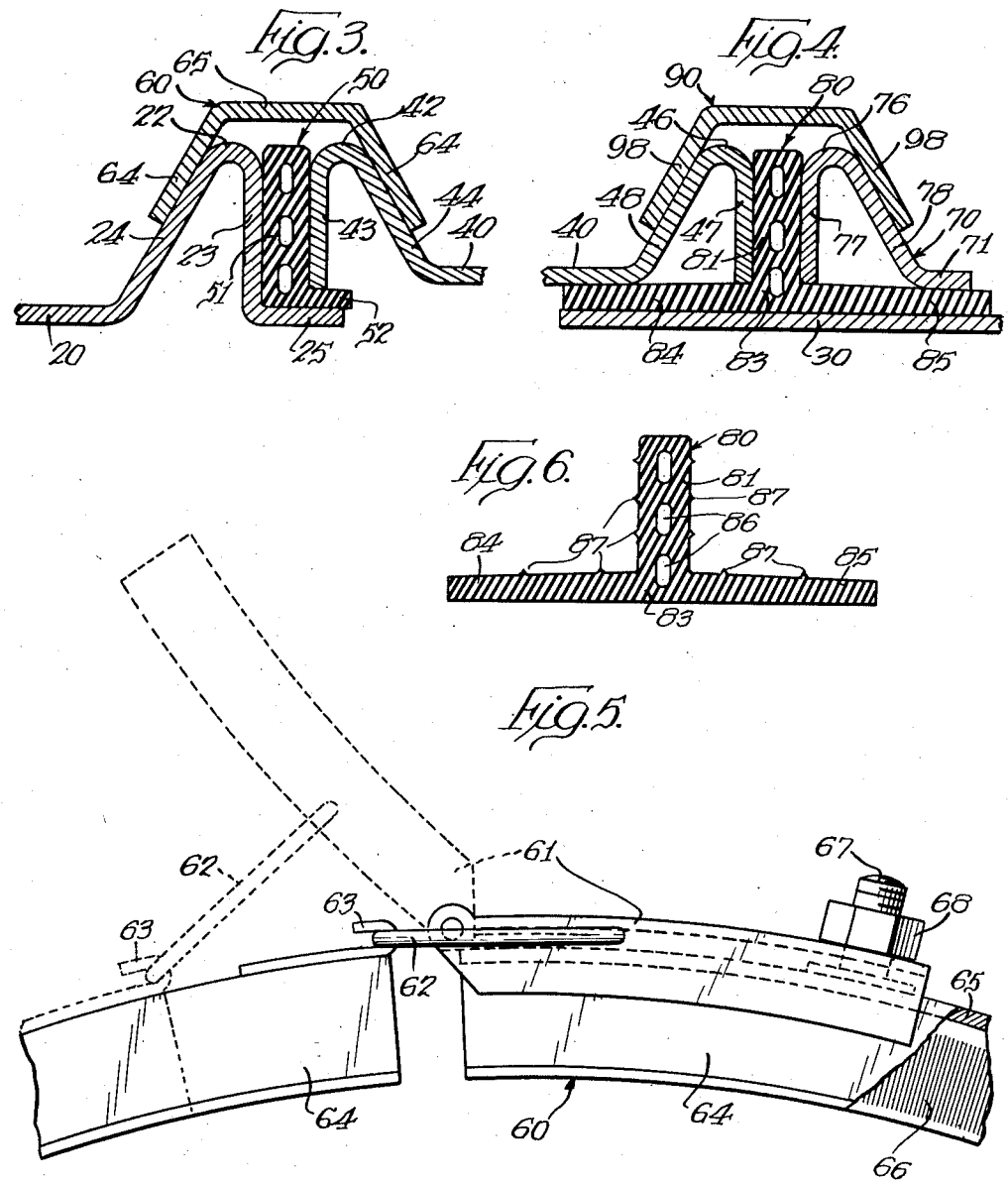

United States Patent Office 2,835,723
Patented May 20, 1958

2,835,723

TELESCOPIC INSPECTION SECTIONS FOR BUS ENCLOSURES

Stanley C. Killian, Glen Ellyn, and Nicholas Polgov, Chicago, Ill., assignors to H. K. Porter Company (Delaware), a corporation of Delaware Application December 6, 1954, Serial No. 473,244

6 Claims. (Cl. 174—85)

The present invention relates to enclosures for bus bars, and particularly, to improve telescopic inspection sections for bus bar enclosures.

Electric conductors for power transmission, commonly known as buses, are frequently enclosed in sealed metal housings to protect them from accumulation of foreign particles, to prevent the entry of moisture, to shield them from the elements and to protect personnel from accidental contacting energized conductors. However, the housing cannot be permanently sealed, but must at least include spaced sections that can be either removed or opened to accommodate installation of supporting insulators and bus sections and inspection of the same. A great many proposals have been made for the enclosing of buses and for providing movable inspection sections in the enclosures. Most of the proposed structures have been so complicated to install, cumbersome to handle and difficult to open for inspection as to be highly objectionable and generally unsuitable for extensive use. However, in the copending application of Stanley C. Killian and Willard O. Edison, Serial No. 286,645, filed May 7, 1952, now Patent No. 2,784,012, there is disclosed a very practical bus enclosure comprising spaced stationary, or permanent, sections and movable inspection sections telescopically mounted on alternate stationary sections and normally bridging the gap or space between adjacent sections to provide a complete enclosure for the bus, the telescopic sections each being movable to open the gap between adjacent stationary sections to accommodate inspection of the bus. While this structure as thus far described is highly advantageous, the sealing means disclosed in the said application, which comprises an O-ring seal rollable along and between a stationary section and a telescopic section, has not afforded as efficient a structure as could be desired. The seal is not positive in all cases, the movement of the sealing member cannot be accurately fixed, and the frictional resistance to movement is great since the sealing member is compressed between, yet must roll between, the outer and inner peripheral surfaces, respectively, of a stationary section and a movable section.

It is an object of the present invention to provide improved telescopic inspection sections for bus enclosures.

More particularly, it is an object of the invention to provide an improved bus enclosure including inspection sections utilizing a telescopic arrangement similar to that of the said copending application and providing improved sealing means therefor overcoming the disadvantages of the sealing means previously adopted.

Another object of the present invention is to provide improved telescopic inspection sections for bus enclosures including sealing means at each juncture of the telescopic and stationary sections, each sealing means comprising, in combination, opposed ribs, a seal confinable between the opposed ribs, and a locking ring engageable with the outer surfaces of the ribs for drawing the ribs together and compressing the seal therebetween.

A further object of the invention is the provision of improved sealing means between a telescopic bus enclosure section and the stationary section upon which it telescopes including a resilient sealing member that is independently movable along the stationary section in a very convenient manner to eliminate frictional resistance of the sealing member to opening of the telescopic section when it is intended that the telescopic section be opened.

In conjunction with the immediately foregoing, it is also an object of the invention to include in the improved sealing means an independently movable ribbed ring on the said stationary section to the side of the sealing member opposite the telescopic section, said sealing member and ribbed ring each being independently movable toward and away from the telescopic section to accommodate independent and convenient movement of the telescopic section, the rib of said ribbed ring being engageable by the locking ring of the sealing means in accordance with the second foregoing object to be carried into forcible engagement with the sealing member to force the sealing member into sealed engagement, not only with the telescopic section and the ribbed ring, but also with the peripheral surface of the stationary section, whereby the stationary section on which the telescopic section telescopes may be entirely devoid of any surface irregularities, such as sealing ribs or the like, thus to facilitate assembly and movement of the telescopic section.

A still further object of the invention is the provision of improved sealing means for telescopic bus enclosure sections including sealing members having axial extensions disposable between adjacent sections or parts of the enclosure to insulate one from another, thus to mitigate against circulating currents running the length of the enclosure.

An additional object of the invention is the provision of improved sealing means for telescopic bus enclosure sections including a locking ring which, when locked, comprises an electrical shunt between the metallic parts connected thereby. Specifically, it is an object to provide a pair of locking rings for each telescopic section, one to connect the telescopic section mechanically and electrically to one stationary section and the other to connect the said ribbed ring mechanically and electrically to the telescopic section, the resilient seal between the telescopic section and ribbed ring including extension means insulating the telescopic section from the other stationary section.

Still another object of the invention is the provision of an improved sealed connection or joint for telescopic bus enclosure sections which will not transmit vibration from one section of the enclosure to another.

And a further object of the present invention is the provision of improved bus enclosure means accommodating radial and longitudinal adjustment to compensate for misalignment resulting from inaccuracy of supporting members.

Other objects and advantages of the present invention will become apparent in the following detailed description of a preferred embodiment of the invention.

Now, in order to acquaint those skilled in the art with the manner of making and using the bus enclosure means of the present invention, we shall describe, in connection with the accompanying drawings, a preferred embodiment of the bus enclosure means of the invention and a preferred manner of making the same.

In the drawings:

Figure 1 is a fragmentary perspective view of a bus bar and an enclosure therefor, a longitudinal section of the enclosure being broken away clearly to reveal the bus and the various components of the enclosure, the view showing the telescopic section of the enclosure in its closed position;

Figure 2 is a view similar to Figure 1 showing the telescopic section of the enclosure in its opened position;

Figure 3 is a fragmentary sectional view, on an enlarged scale, of the sealing means provided between one stationary section and the telescopic section of the enclosure;

Figure 4 is a fragmentary sectional view, on the same scale as Figure 3, of the sealing means provided between the telescopic section and the stationary section upon which it telescopes;

Figure 5 is an elevation, also on an enlarged scale, of the locking portion of one locking ring, the view showing the locked position of the ring in solid lines and the opened position thereof in dotted lines; and Figure 6 is a cross sectional view of a preferred form of sealing member.

Referring now to the drawings, and particularly to Figures 1 and 2, we have shown a continuous bus 10 which may suitably be made up of a plurality of bus sections 11, such as copper or aluminum square tube or other known sections, which may be joined together in endwise abutting engagement and in various angular relationships by straps 12 or the like riveted or otherwise secured to adjacent sections. The bus 10 is adapted to be supported at spaced points by means of one or more insulators 13.

Solely by way of example, the insulators 13 are shown at each point of support as being four in number and as being disposed radially and diagonally of the square tube bus sections 11 to support the bus axially of the assembly. As will be appreciated, however, any known manner of supporting the bus sections by one or more insulators may be employed with equal facility. The insulators 13 are carried by and mounted in bus rings 14 to support the bus axially of or perpendicular to the plane of the rings. Each ring 14 preferably includes mounting block portions 15 facilitating mounting of the bus rings in any desired manner, for example, from a ceiling, on a floor, or on a vertical wall. The bus supporting rings 14 are usually circular, and we adapt a cylindrical bus enclosure to the circular rings in the preferred embodiment of our invention. However, if other configurations of the enclosure are desired, the same may be adapted to circular rings, or the configuration of the ring members may be changed to conform to that of the enclosure.

The bus enclosure of the present invention comprises a plurality of longitudinally spaced stationary enclosure sections, each mounted on at least one bus ring, and a plurality of telescopic enclosure sections each bridging the space between adjacent stationary sections. One complete structural arrangement of a pair of spaced stationary enclosure sections and one telescopic enclosure section is shown in the drawings, this arrangement being repeated at longitudinally spaced intervals throughout the full length of the bus, fully to enclose the bus. As shown in Figures 1 and 2, each such arrangement comprises a first stationary enclosure section 20, preferably formed of metal which is suitably cylindrical and completely encompasses and encloses a portion of the bus 10 in coaxial relation thereto. The section 20 is received and secured within and supported by a bus ring 14, and may suitably terminate adjacent, but in spaced relation to the ring. Adjacent its outer or terminal end, the section 20 is beaded or bulged outwardly to define a radially outwardly extending, circumferential rib 22 having a radial end face 23 and an inclined inner surface 24 facing oppositely of the face 23, the said radial end face 23 being disposed in spaced parallel relation to the outer end of the section to define a cylindrical terminal portion 25 on the section.

A second stationary enclosure section 30, which is preferably of the same configuration, cylindrical in the embodiment shown, and diameter as the main portion of the section 20, is disposed in axially aligned, longitudinally spaced relation to the section 20 to enclose another portion of the bus 10. This second section 30 is also received and secured within and supported by a bus ring 14. The section 30 includes an elongate end portion projecting from the ring 14 toward the section 20, the length of said end portion preferably being greater than the longitudinal spacing between the sections 20 and 30 and comprising a continuous, uniform, cylindrical surface.

In construction, we prefer to form the sections 20 and 30 identically so that each section at one end includes the continuous uniform cylindrical surface described in conjunction with the section 30 and at its opposite end includes the rib 22 and terminal portion 25 described in connection with the section 20, the section 30 being shown in Figures 1 and 2 as comprising one such complete section including a rib 32 at its right hand end. However, if desired, the respective end portions may be formed on separate sections, and tubular extensions may be employed between the separate sections to accommodate assembly of as long a length of stationary section means as may be required or deemed appropriate in given instances.

In any case, as will be appreciated, the space provided between two adjacent stationary sections accommodates inspection and examination of the bus 10 whenever desired. Normally, however, the space between the two sections must be closed to seal the bus within its enclosure.

To close the gap or space between the two spaced stationary enclosure sections 20 and 30, the present invention provides a telescopic enclosure section 40 which is preferably of the same configuration as the sections 20 and 30, but which is fabricated to define an inner diameter slightly greater than the outer diameter of the stationary sections. The telescopic section 40 is of a length greater than the spacing between the stationary sections and normally bridges that space and telescopes over the terminal end portion 25 of the section 20 and the adjacent end portion of the section 30 to be supported at both of its ends by the stationary sections. Preferably, the end portion of the stationary section 30 is of a length greater than that of the telescopic section 40, and the section 40 is adapted to telescope fully over said end portion completely to open the inspection space. Immediately at the end thereof adjacent the section 20, the movable or telescopic section 40 is provided with a radially outwardly extending circumferential rib 42 which is opposed to the rib 22 and comprises a radial end face 43 and an inclined inner surface 44. At its opposite end, the movable section 40 is provided with a similar, but reversely related, rib 46 comprising a radial end face 47 and an inclined inner surface 48.

When the section 40 is positioned to bridge the gap or space between the stationary sections 20 and 30, the rib 42 of the section 40 is disposed adjacent the rib 22 of the section 20 with the radial faces 43 and 23 thereof opposed to one another and with the ribbed portion of the section 40 telescoped over the cylindrical terminal portion 25 of the section 20, as is shown in Figure 1, and as is shown in greater detail in Figure 3. As pointed out hereinbefore, it is necessary to seal the sections together to prevent the entry of moisture and foreign particles. To afford the necessary seal, an annular sealing member 50 is disposed between the ribs 22 and 42 of the two sections. Since this seal need not move when opening the telescopic section of the enclosure, the same is preferably secured to the section 20 in engagement with the end face 23 of the rib 22 thereof to prevent displacement of the seal. While glue, cement, or the like may be used to secure the seal in place, we have found in actual practice that by forming the seal of an inner diameter substantially equal to the outer diameter of the cylindrical terminal portion 25 of the section 20, the seal 50 may be conveniently slipped onto the portion 25, whereupon the seal frictionally holds itself securely on the portion 25 without need for cement or the like.

The seal 50 preferably comprises an annular body portion 51 presenting opposed radial faces for engagement, respectively, with the end faces 23 and 43 of the sections 20 and 40. The body 51 of the seal may suitably be recessed or hollowed at portions thereof to increase the flexibility and resiliency of the seal. At its inner margin, the seal 50 also includes a cylindrical, axially projecting extension 52, which projects from one side only of the portion 51, the side opposite the rib 22 on the stationary section 20, and which overlies the cylindrical part 25 of the section 20. Preferably, the extension 52 is tapered to facilitate sliding movement thereover of the radially inward edge of the end face 43 of the rib 42 on the movable section 40.

As will be appreciated, the ribs 22 and 42 should be brought into forcible engagement with the seal 50 to afford an optimum sealing function, and also, the sections 20 and 40 should normally be secured together to prevent inadvertent or accidental opening of the enclosure. To accomplish both functions, the present invention provides clamping or locking means, which not only performs the two functions, but also accommodates the convenient and rapid detachment of the two enclosure sections, and constitutes an electrical shunt therebetween in the locked position of said means. The clamping or locking means is shown in closed or locked position in Figure 1 and in solid lines in Figure 5, and is shown in unlocked or opened position in Figure 2 and in dotted lines in Figure 5. As shown, the locking means comprises a split ring 60 of generally channel shape in cross section, which is provided at the split ends thereof with a toggle linkage facilitating opening and forcible closing of the ring to increase and decrease, respectively, the diameter thereof. The channel shape of the ring defines a pair of oppositely inclined leg portions 64 which complement and are adapted to cooperate with the inclined surfaces 24 and 44 of the ribs on the sections 20 and 40, respectively. Between the inclined portion 64 thereof, the ring 60 includes a base portion 65 defining a predetermined spacing of the radial end faces 23 and 43 of the ribs on the two sections of such extent as to necessitate compression of the body 51 of the seal 50 between the said end faces upon application of the ring to the ribs 22 and 42.

The toggle linkage employed comprises a first link 61, of channel form complemental to that of the ring 60, which is pivotally mounted at one end thereof upon one end of the ring, and a second link 62, in the form of a bail, which is pivotally and detachably connected at one thereof to the other end of the ring 60 by means of a hook 63 provided on said other end of the ring 60. At the other end thereof, the second link or bail 62 is pivotally connected to the first link 61 at a point intermediate the ends of the link 61. The ring 60 in its closed position is of a diameter clampingly to engage the ribs 22 and 42 of the sections 20 and 40. Upon opening of the linkage, by moving the link 61 from the position shown in solid lines in Figure 5 to the position shown in dotted lines in that figure, spreading of the ends of the ring is accommodated, thus to increase the diameter of the ring to such extent that the ring may readily be moved over and out of alignment with the ribs 22 and 42 to accommodate separation of the two sections. Preferably, the ring 60 is presprung to effect automatic increase of diameter upon opening of the linkage. Further, when the linkage is open, the bail 62 may be detached from its mounting hook 63 to accommodate removal of the ring from the bus enclosure sections. To clamp the sections 20 and 40 together, the locking ring 60 is disposed over and generally aligned with the adjacent ribs, and the link 61 of the toggle linkage is moved toward that end of the ring to which it is attached. As such movement occurs, the link 62, which is then connected to the hook 63, is moved toward the end of the ring on which the link 61 is mounted, thus to decrease the diameter of the ring. As the diameter decreases, the inclined sides 64 of the ring engage the inclined surfaces 24 and 44 of the ribs 22 and 42. At this point, the ribs 22 and 42 are biased apart by the sealing member 50 to an extent greater than that accommodated by the channel-shaped cross section of the ring, so that the ring commences to cam the two ribs toward one another, i. e., to draw the ribs together. Actually, of course, movement is restricted to the telescopic section 40 and this section is thus drawn toward the stationary section 20. The toggle linkage affords a substantial mechanical advantage positively to draw the two sections together and to compress the body 51 of the seal 50 therebetween, sealing engagement being effected at the end faces 23 and 43 and on the surface of the portion 25. Complete sealing is preferably effected well before the channel 61 is received over the locking ring 60, so that a wide safety factor is provided and effective sealing is assured over a substantial period of time, irrespective of the number of times the locking ring is opened. As will be appreciated, the seal 50 will be deformed during such locking action. However, for purposes of clarity of disclosure, the seal is shown in substantially undeformed configuration in the drawings.

In addition to detachably connecting the enclosure sections 20 and 40 together, the locking ring 60, being formed of metal, as are the sections 20 and 40, electrically connects and acts as a shunt between the sections 20 and 40 to constitute the same a common electrical conductor of circulating currents, which conductor is grounded through the bus ring 14 supporting the section 20. To insure the electrical shunting function, the inner surfaces of the inclined legs 64 of the ring 60 are preferably serrated as indicated at 66 in Figure 5, to bite into the material of the ribs 22 and 42 on the sections 20 and 40 to provide good electrical connection therebetween.

From the foregoing, it is to be appreciated that the locking ring 60 comprises a band of variable length that encompasses the enclosure sections and is increased in length to release the sections and decreased in length to clamp the sections together and constitute a shunt therebetween. To retain the ring or band fixedly in the closed position thereof, the ring 60 is preferably provided with a radially extending bolt 67 on the end thereof adjacent the link 61, the link having an aperture in the base wall thereof through which said bolt extends in the closed position of the linkage, the link 61 being locked to the bolt and the ring 60 by means of a nut 68 threaded onto the bolt 66.

At the opposite end of the telescopic section 40, it is highly desirable to maintain the exposed end portion of the stationary section 30 totally unobstructed and devoid of irregularities to facilitate sliding of the telescopic section thereon, and yet, these two sections must be sealed and connected together in the closed position of the telescopic section. To meet these objects, the present invention provides novel sealing means between the two sections. The first element of this sealing means is the ribbed portion 46 of the telescopic section 40, and the second element comprises a ribbed ring or band 70 which is telescopically or slidably mounted on the free end of the stationary section 30 inwardly of the telescopic section 40. The ring 70 comprises a cylindrical base or band portion 71 of a diameter greater than that of the section 30 so as to be freely slidable on that section, and a radially outwardly extending circumferential rib 76 similar to, but reversed with respect to, the rib 46.

The rib 76 defines a radial end face 77 opposed to the face 47 of the rib 46 and an inclined inner surface 78.

To afford a seal between the section 40 and the ring 70, and between these two members and the stationary section 30, a sealing member 80 is provided which is quite similar to the seal 50. The seal 80 includes a resilient hollow body portion 81 confinable between the ribs 46 and 76, which portion defines opposed radial surfaces engageable with the radial faces 47 and 77 of the two ribs to seal against the two ribs. The seal 80 differs from the seal 50 in the provision of a relatively wide cylindrical base portion 83 extending equally to opposite sides of the body portion 81 and to define oppositely projecting cylindrical, axial extensions 84 and 85, each of which is relatively long and tapered to be received, respectively, under the ribbed portion 46 of the section 40 and under the entirety of the ribbed ring 70. The seal 80 is formed to have an inner diameter, at the base portion 83 thereof, slightly greater than the outer diameter of the stationary section 30, so that the seal may readily be slipped on and slid along the smooth peripheral surface of the section 30 between the ribbed ring 70 and the movable section 40. In use, the sealing member 80 may thus readily be moved along the free end portion of the section 30 by sliding the same along the said smooth surface and/or by working the same along the surface by alternately pushing on or flexing the opposite sides thereof, much in the same manner as a person would move a rubber band along his arm.

In the closed position of the telescopically movable enclosure section 40, the seal 80 is moved outwardly on the stationary section 30 and the forward or outer extension 84 of the seal is slid under the adjacent end of the section 40, to insulate the sections 30 and 40 from one another, until the body 81 of the seal abuts against the radial face 47 of the rib 46. The ribbed ring 70 is then moved outwardly on the section 30 and slid over the inner extension 85 of the seal and into engagement with the body thereof to insulate the ring from the sections 30 and 40 and to bring the components 30, 40, 70 and 80 into sealing relationship. To clamp the four components together in fixed and intimately sealed relationship, a locking ring 90 is provided which is identical to the locking ring 60, the same including internally serrated inclined walls 98 complemental to and cooperable with the inclined surfaces 48 and 78 of the ribs 46 and 76 for the purpose of drawing said ribs together and compressing the body 81 of the seal 80 therebetween to seal the members 40 and 70 together. In addition, the locking ring 90 upon effecting compression of the seal 80, causes the seal to distort radially inwardly, whereupon the base 83 of the seal is forced into sealing engagement with the stationary section 30, the said four components then being at least frictionally locked together and sealed with respect to one another. In view of the sealing effect afforded, it is to be appreciated that the ribbed band or ring 70, which is preferably formed of metal, is provided especially for accomplishment of the sealing function and may, therefore, be referred to as a sealing band.

As will be appreciated from the foregoing, the locking ring 90 acts as an electrical shunt between the telescopic section 40 and the ribbed ring 70, whereby, in the closed and locked position of the enclosure, the stationary section 20, telescopic section 40, locking ring 60, ring 70 and locking ring 90 are electrically connected and are commonly grounded through the bus ring 14 supporting the section 20. At the same time, the seal 80 insulates the section 30 from this electrically conducting assembly and the section 30 is separately grounded through its supporting bus ring 14. Thus, the seal 80 serves to prevent circulating currents from running the length of the enclosure and each assembly of one stationary section and one telescopic section is thoroughly grounded to dissipate circulating currents. By utilizing the locking rings 60 and 90 directly as electrical shunts, the present invention obviates the need heretofore experienced for special shunting means and thus affords a highly economical and conveniently assembled and operated bus enclosure.

Due to the provision of sealing means at the section 30 in the form of components which all are movable with respect to the section 30, longitudinal expansion and contraction of, and other longitudinal variations in, the enclosure, including inaccuracies resulting during assembly, are readily accommodated and compensated for automatically at the sealing means 46, 70, 80, 90. Also, the resilient sealing members 50 and 80 and the locking rings 60 and 90 readily accommodate and automatically compensate for radial or lateral misalignment of adjacent stationary sections, as may result, for example, in assembly and mounting of the enclosure. Further, the resilient seals absorb and prevent transmission along the entire length of the enclosure of mechanical vibrations, which may, for example, result from operation of a generator or the like mounted on an island in the bus system.

The seals 50 and 80 are each preferably formed of extruded rubber strips, formed as shown in Figures 3 and 4, respectively, which are cut to proper length and looped into annuli, after which the ends of each annulus are vulcanized togethehr to complete the respective seals. Referring to Figure 6, we have shown a preferred cross-sectional form of the seal 80 as including the body 81, base 83 and lateral extensions or flanges 84 and 85. The seal is preferably extruded directly in the form shown with a plurality of parallel bores 86 running longitudinally through the body 81. On the opposite faces of the body 81 and on the upper surfaces of the flanges 84 and 85, spaced parallel longitudinal ribs 87 are preferably extruded integrally on the seal. These ribs project a minimum distance from the respective surface and define lines of primary sealing which, in the completed enclosure assembly, define annular traps insuring against the entry of moisture and dust to the interior of the enclosure. Preferably, the seal 50 is likewise formed with projecting ribs for the same advantageous purpose.

As formed in accordance with the foregoing, the bus enclosure of the present invention affords a completely sealed enclosure preventing entry of dust and moisture, shielding the bus from exposure to the elements and protecting personnel. As many of the enclosure units herein specifically shown and described as needed may be provided to enclose a complete bus system and to provide inspection openings at spaced intervals in the system as may be required. It is the provision by the present invention of normally closed, readily opened, inspection openings that is of a special benefit.

Assuming the inspection opening to be closed, with the various components disposed as shown in Figure 1, opening of the telescopic section 40 to accommodate inspection of the bus 10 is quickly and conveniently effected as follows: The locking ring 90 is first released by removing the lock nut (68) from the radial bolt (67) and by swinging the channel link (61), the operating link, in the direction of the bail link (62) to increase the diameter of the locking ring. After being released, the locking ring 90 is slid over the ribs 46 and 76, with which it cooperates, in either direction, for example, onto the telescopic section 40 as shown in Figure 2. The ribbed ring or band 70 is then slid inwardly on the stationary section 30 toward the adjacent bus ring 14, the ring or band 70 being moved independently of the other members. The extension 84 of the seal 80 is then slid out from under the telescopic section 40 and the seal 80 is worked inwardly on the section 30 to adjacent the ring 70, as is shown in Figure 2, also independently of the other members. After the one end of the telescopic section has been freed, the locking ring 60 is released in the same manner as described for the ring 90, the ring 60 being moved to either side of the ribs 22 and 42, for example, onto the main portion of the stationary section 20. The telescopic section 40 is now released and may readily be telescoped onto the section 30 to open the space between the stationary sections 20 and 30 to accommodate inspection of the bus 10, as will be appreciated from Figure 2. Since the present invention provides a smooth, uniform stationary section 30, the ring 70, seal 80 and telescopic section 40 are readily and conveniently slid inwardly onto the section. The section 40 is of light weight and readily moved, and movement thereof does not disturb the seal 50. The time required to open the telescopic section is hardly more than the time required to explain the manner of opening.

To reclose the telescopic section and reseal the bus enclosure, the operations are the reverse of those above described. Specifically, the section 40 is slipped toward the section 20 to telescope the ribbed portion 42 over the end portion 25 of the section 20 and over the extension 52 of the seal 50, thus to support the section 40 at each end thereof on the sections 20 and 30 and to dispose the rib 42 in engagement with the seal 50. The locking ring 60 is then disposed over and clamped onto the ribs 22 and 42 to draw the telescopic section 40 toward the section 20 and to effect a seal between the two, the ring thereafter being locked by application of the nut 68. The seal 80 is then slid into engagement with the rib 46 of the section 40, with the extension 84 being slid into the interior of the section 40, after which the ring or band 70 is slid into engagement with the body 81 and onto the extension 85 of the seal 80. The locking ring 90 is then disposed over the ribs 46 and 76 and clamped onto the same to draw the ring or band 70 into intimate sealing engagement with the seal 80 and to connect the parts 30, 40 and 70 together, with the section 30 insulated from the components 20, 40, 60, 70 and 90, the ring 90 thereafter being locked by threading the lock nut onto the bolt to complete the reclosing.

From the foregoing, it is to be appreciated that the present invention affords a very economical and highly practical bus enclosure including improved telescopic sections and improved sealing means therefor, which telescopic sections may be rapidly and conveniently opened and closed to accommodate inspection of the bus. The invention is capable of wide application and is not necessarily limited to a cylindrical structure as shown herein.

While we have described what we regard to be a preferred embodiment of our invention, it will be appreciated that various changes, rearrangements and modifications may be made therein without departing from the scope of the invention, as defined by the appended claims.

We claim:

1. A bus enclosure comprising a first stationary cylindrical section having a radially outwardly extending circumferential rib adjacent but spaced from one end thereof, a first annular seal rested on the one end of said section adjacent said rib, a second cylindrical stationary section disposed in axially aligned, longitudinally spaced relation to the first section, said second section being devoid of rib means at the end thereof adjacent said first section, a cylindrical section of an inner diameter slightly greater at the opposite ends thereof than the outer diameter of said first and second sections telescopically mounted on said second section, said telescopic section being of a length greater than the space between said stationary sections and having a radially outwardly extending circumferential rib at each end thereof, a second annular seal slidably mounted on said second section to the side of said telescopic section opposite said first section, a circumferentially ribbed ring telescopically mounted on said second section to the side of said second seal opposite said first section, said telescopic section being slidable on said second section toward said first section to dispose the rib at the end thereof adjacent the rib on said first section in engagement with said first seal, the said end of said telescopic section telescoping over and resting upon the adjacent end of said first section, said second seal being slidable on said second section toward said telescopic section to dispose said seal in engagement with the rib at the adjacent end of said telescopic section, said ribbed ring being slidable on said second section toward said telescopic section to dispose the rib thereof in engagement with said second seal, each adjacent pair of ribs having radially extending opposed end faces between which the respective seal is confined and inwardly divergent inclined opposite faces, and a pair of split locking rings one for each pair of ribs, one of said locking rings being telescopically mounted on said sections and being movable, when open, into a position encompassing the adjacent ribs on said first and telescopic sections, the other of said locking rings being telescopically mounted on said sections and being movable, when open, into a position encompassing the adjacent ribs on said telescopic section and said ribbed ring, each of said locking rings including means for decreasing the diameter thereof forcible to close the same upon the respective pair of ribs, each of said locking rings including inclined surfaces complemental to said divergent faces of the respective pair of ribs and defining between the said inclined surfaces a predetermined spacing of said ribs in the closed position of the locking ring necessitating compression of the respective seal between the respective pair of ribs, said one locking ring upon being closed camming said telescopic section toward said first section and compressing said first seal between the adjacent ribs on said first and telescopic sections, said other locking ring upon being closed camming said ribbed ring toward said telescopic section and compressing said second seal between the adjacent ribs on said telescopic section and said ribbed ring and compressing said second seal into engagement with the periphery of said second section, the space between said first and second sections being opened upon operation and movement of the various elements in the order reverse to that defined.

2. A bus enclosure as set forth in claim 1, wherein said one locking ring comprises an electrical shunt between said first section and said telescopic section, said other locking ring comprises an electrical shunt between said telescopic section and said ribbed ring, and said second seal includes extensions positioned between said second section and said telescopic section and said ribbed ring to insulate said second section from said locking rings, said ribbed ring and said first and telescopic sections in the closed position of the enclosure.

3. A bus enclosure comprising electrically conductive enclosure means having a peripheral opening therein, an electrically conductive movable enclosure section telescopically associated with said means and normally closing said opening, said section being movable to open and close said opening, an electrically conductive independently movable band telescopically associated with said means adjacent one end of said movable section, said movable section and said band having opposed end faces, sealing means mounted on said enclosure means between said movable section and said band, said sealing means including portions extending axially in opposite directions from said opposed end faces and normally projecting respectively between said movable section and said means and between said band and said means for electrically insulating said one end of said movable section and said band from said enclosure means, said sealing means also including a portion normally confined between and sealing against said opposed end faces, at least said last-named portion of said sealing means being telescopically mounted for independent movement on said enclosure means, said last-named portion of said sealing means when abutted against said end face of said movable section having parts thereof disposed exteriorly of said movable section adapted to be grasped and moved manually away from said movable section, said band and at least said last-named portion of said sealing means being telescopically movable in sequence on said enclosure means independently of one another away from said movable section to accommodate, subsequently, free telescopic movement of said movable section on said enclosure means to open said opening, and an electrically conductive clamp detachably associated with said band and said movable section about said opposed end faces thereof in telescopic relation to said enclosure means, said clamp normally forcing said band toward said movable section to confine said last named portion of said sealing means between said opposed end faces and to seal said movable section and said band to one another and to said enclosure means, said movable section, said band and said clamp being electrically connected to one another and being insulated by said sealing means from said enclosure means at least at said one end of said movable section.

4. A bus enclosure comprising enclosure means having an opening therein, said enclosure means to one side of said opening having an outwardly extending rib thereon, an enclosure section movably mounted on said means to the side of said rib to which said opening is disposed, said section being movable away from and toward said rib to open and close said opening, said rib and the adjacent end of said section having opposed end faces, first sealing means carried by said enclosure means adjacent said end face of said rib, first clamping means normally engaging said rib and the adjacent end portion of said movable section for drawing said movable section toward said rib and confining said first sealing means between said opposed end faces to seal said movable section at the one end thereof to said rib and enclosure means, an independently movable band movably mounted on said enclosure means adjacent the other end of said movable section, said band and said other end of said movable section having opposed end faces, second sealing means carried by said enclosure means between said movable section and said band, said second sealing means including portions normally insulating said movable section and said band from said enclosure means and a portion normally confined between and sealing against said opposed end faces of said band and said other end of said movable section, at least said last-named portion of said second sealing means being movably mounted on said enclosure means, said last-named portion of said second sealing means when abutted against said end face on said other end of said movable section having parts thereof disposed exteriorly of said movable section adapted to be grasped and moved manually away from said movable section, whereby said band and at least said last-named portion of said second sealing means are adapted to be moved telescopically on said enclosure means independently of one another and said movable section to accommodate free telescopic movement of said movable section on said enclosure means toward and away from said first sealing means and said rib to close and open said opening, and second detachable clamping means normally engaging said band and said other end portion of said movable section for drawing said band toward said movable section and confining said last-named portion of said second sealing means between the opposed end faces of said band and said other end of said movable section to seal said band to said movable section and said enclosure means.

5. A bus enclosure comprising a pair of aligned electrically conductive enclosure sections, a conductive support stationarily supporting and grounding each of said sections in spaced relation to the ends of said sections, said sections being spaced apart at their adjacent ends to expose a bus supported therein, said sections having adjacent end portions of substantially the same size, a movable conductive enclosure section of a size greater than said portions of said stationary sections telescopically mounted on one of said sections, said movable section being of a length greater than the space between said sections and normally telescoping over the adjacent ends of said sections to enclose the bus, first means carried by the other of said stationary sections including a conductive portion spaced from said end of said other section and a first seal mounted on said end, second means mounted on said one stationary section normally sealing said movable section to and insulating the same from said one section, said second means including a second seal and an axially movable conductive portion each telescopically mounted on said one stationary section in opposed relation to the adjacent end of said movable section for movement independently of each other and said movable section, said portions of said first and second means and the adjacent ends of said movable section each having opposed end faces and inclined faces oppositely of said end faces, each pair of inclined faces being inwardly divergent, said seals, respectively, being confined between said opposed end faces of said portion of the respective one of said means and the adjacent end of said movable section, and a pair of conductive locking bands complemental to and engaging the pairs of inclined faces at the opposite ends of said movable section, said bands when contracted on said pairs of inclined faces forcing said portions of said means and said movable section together and forcibly confining said seals between the respective pairs of opposed end faces, said second means insulating said movable section, said portion of said second means and the respective band from said one stationary section to prevent circulating currents from running the length of the enclosure, said bands electrically connecting said portions of said means, said movable section and said bands together for connecting the same to said other stationary section to be grounded therewith, whereby each electrically conductive component of the enclosure is grounded to prevent dangerous current build-ups, said portion of said second means, said second seal and the respective band, upon opening of said band, being movable independently of one another to accommodate, upon opening of the other band, free telescopic movement of said movable section onto said one stationary section.

6. A bus enclosure comprising a pair of axially aligned metallic enclosure sections, a metallic bus ring stationarily supporting and grounding each of said sections in spaced relation to the ends of said sections, said sections being spaced apart at their adjacent ends to expose a bus supported in insulated relation axially therein, said sections having adjacent end portions of uniform diameter at least one of which is of substantial length, a movable metallic enclosure section of a diameter greater than said portions of said stationary sections telescopically mounted on said one section, said movable section being of a length greater than the space between said sections normally to bridge the space and telescope over the adjacent ends of said sections to enclose the bus, first means carried by the other of said stationary sections including an outwardly extending metallic portion spaced from said end of said other section and a first sealing ring mounted on said end, second means mounted on said one stationary section for normally sealing said movable section to and insulating the same from said one section, said second means including a second sealing ring and an axially movable outwardly extending metallic portion each telescopically mounted on said one stationary section for movement independently of each other and said movable section, said portions of said first and second means and the adjacent ends of said movable section each having opposed end faces and inclined faces oppositely of said end faces, each pair of inclined faces diverging radially inwardly, said seals, respectively, being confined between said opposed end faces of said portion of the respective one of said means and the adjacent end of said movable section, and a pair of circumferentially adjustable metallic locking rings of generally V-shape in cross section respectively engaging the pairs of inclined faces at the opposite ends of said movable section, said locking rings when contracted on said pairs of inclined faces caming said portions of said means and said movable section together and forcibly confining said sealing rings between the respective pairs of opposed end faces, said second means insulating said movable section, said portion of said second means and the respective locking ring from said one stationary section to prevent circulating currents from running the length of the enclosure, said locking rings electrically connecting said portions of said means, said movable section and said locking rings together for connecting the same to said other stationary section to be grounded therewith, whereby each metallic component of the enclosure is grounded to prevent dangerous current build-ups in the enclosure, said portion of said second means, said second sealing ring and the respective locking ring, upon opening of said locking ring, being movable independently of one another along said one stationary section to accommodate, upon opening of the other locking ring, free telescopic movement of said movable section onto said one stationary section.

References Cited in the file of this patent

UNITED STATES PATENTS

| | | |
|---|---|---|
| 740,664 | Kroll | Oct. 6, 1903 |
| 755,994 | Broome | Mar. 29, 1904 |
| 2,269,664 | Hallerberg | Jan. 13, 1942 |
| 2,278,754 | Wolcott | Apr. 7, 1942 |
| 2,319,518 | Rau | May 18, 1943 |
| 2,359,239 | Newton | Sept. 26, 1944 |
| 2,457,438 | Bennett | Dec. 28, 1948 |
| 2,689,141 | Kiekhaefer | Sept. 14, 1954 |
| 2,704,355 | Holton | Mar. 15, 1955 |
| 2,784,012 | Killian et al. | Mar. 5, 1957 |